United States Patent [19]

Oh

[11] Patent Number: 5,049,792
[45] Date of Patent: Sep. 17, 1991

[54] CIRCUIT FOR STABILIZING HIGH VOLTAGE ACCORDING TO THE CHANGE OF HORIZONTAL OSCILLATING FREQUENCY

[75] Inventor: Changseog Oh, Suwon, Rep. of Korea

[73] Assignee: Samsung Electron Devices Co., Ltd., Rep. of Korea

[21] Appl. No.: 536,784

[22] Filed: Jun. 12, 1990

[30] Foreign Application Priority Data

Dec. 18, 1989 [KR] Rep. of Korea .................... 89-19199

[51] Int. Cl.[5] ............................................. H01J 29/70
[52] U.S. Cl. .................................... 315/411; 315/408
[58] Field of Search ................................ 315/408, 411

[56] References Cited

U.S. PATENT DOCUMENTS 4,958,110 9/1990 Hayase ................................ 315/408

Primary Examiner—Theodore M. Blum
Attorney, Agent, or Firm—Cushman, Darby & Cushman

[57] ABSTRACT

There is disclosed a circuit for stablizing the high voltage of the high voltage generating circuit in a CRT according to the change of the horizontal oscillating frequency, comprising a diode, the cathode of said diode being connected to the intermediate terminal of a flyback transformer (FBT), the anode of said diode being connected to first resistor and a variable resistor, a first transistor, the base of the said first transistor being connected to the intermediate terminal of said variable resistor, a second transistor, a third transistor, the collector of said first transistor being connected through a grounded second resistor to the base of said third transistor, the collector of said third transistor being connected to the base of said second transistor, the collector of said second transistor being connected to a direct current source, and a fourth transistor, the emitter of said second transistor being connected through the primary coil of said flyback transformer to the collector of said fourth transistor, the base of said fourth transistor being connected to a horizontal oscillating circuit.

1 Claim, 2 Drawing Sheets 5,049,792

CIRCUIT FOR STABILIZING HIGH VOLTAGE ACCORDING TO THE CHANGE OF HORIZONTAL OSCILLATING FREQUENCY

BACKGROUND OF THE INVENTION

The present invention concerns a circuit for stabilizing high voltage according to the change of the horizontal oscillating frequency, wherein a constant high voltage is obtained regardless of the change of at least two horizontal oscillating frequencies applied to a cathode ray tube (CRT).

Conventionally, the high voltage generating circuit of a CRT keeps a constant high voltage regardless of the change of the horizontal frequency or the beam current, and drives the horizontal output stage at a single horizontal frequency. However, as apparatuses such as a computer become to have a variety of functions, it is necessary for them to operate at two or more horizontal frequencies, where regardless of the horizontal frequency changes must be obtained a constant high voltage.

One of such conventional apparatuses is disclosed in Korean Utility Model Publication No. 89-5450 issued on Aug. 18, 1989, which is illustrated in FIG. 2 attached to the present application. According to this high voltage stabilizing circuit, a direct current source 1 is connected to the collector of voltage control transistor TR1, between whose collector and base is connected resistor R1. The emitter of the transistor TR1 is connected to the primary coil of flyback transformer FBT, whose secondary coil has a high voltage rectifying diode D1, whose cathode in turn is connected through a resistor R3 to a variable resistor R4. The intermediate terminal of the resistor R4 is connected to the non-inverting terminal(+) of an operational amplifier OP1, which has an inverting terminal(-) connected to the output thereof, which in turn connected to the base of a second transistor TR2, which has the collector connected to the base of the first transistor TR1. A third horizontal drive transistor TR3 connected to a horizontal oscillating circuit 3 is connected through a transformer T1 with a fourth horizontal output transistor TR4 connected to the other end of the primary coil of the flyback transformer FBT. A fifth transistor connected to the horizontal oscillating circuit 3 is connected through another transformer T2 to a sixth transistor TR6 of a saw tooth generating circuit connected to a deflection yoke coil DY. The high voltage change produced in the high voltage rectifying diode D2 of the flyback transformer FBT is detected through a third resistor R3, which change causes the output voltage of the operational amplifier OP1 to change, thereby changing the base voltage of the first voltage control transistor TR1 so as to keep constant the flyback pulse voltage Vcp generated from the collector of the fourth horizontal output transistor TR4.

In such a conventional high voltage stabilizing circuit, the change of the high voltage caused by the horizontal frequency change is detected through the anode terminal, so that the flyback transformer FBT is specially prepared because the voltage applied to the anode is at least 25KV.

Consequently, the very high voltage detected needs the constituent elements capable of tolerating it, and moreover makes the circuit design difficult.

SUMMARY OF THE INVENTION

The present invention intends to provide a circuit for stabilizing high voltage according to the change of the horizontal oscillating circuit, wherein the voltage change caused by the horizontal frequency change is detected in order to keep constant the voltage applied to the anode terminal of a CRT. If the high voltage induced in the flyback transformer becomes high, the direct current source is made lower so as to lower it, while if the high voltage becomes low, the direct current source is made higher so as to raise it.

According to the present invention, a circuit for stabilizing the high voltage of the high voltage generating circuit in a CRT according to the change of the horizontal oscillating frequency comprises a diode(D12) the cathode of said diode being connected to the intermediate terminal (AFC) of a flyback transformer (FBT), the anode of said diode(D12) being connected to first resistor(R11) and a variable resistor(VR1), a first transistor(TR11), the base of said first transistor being connected to the intermediate terminal of said variable resistor(VR1), a second transistor(TR12), a third transistor(TR13), the collector of said first transistor being connected through a grounded second resistor(R12) to the base of said third transistor, the collector of said third transistor being connected to the base of said second transistor, the collector of said second transistor being connected to a direct current source, and a fourth transistor(TR14), the emitter of said second transistor being connected through the primary coil of said flyback transformer to the collector of said fourth transistor, the base of said fourth transistor being connected to a horizontal oscillating circuit.

The present invention will now be described more specifically with reference to the drawings attached only by way of example.

DETAILED DESCRIPTION OF THE INVENTION

Figure 1:
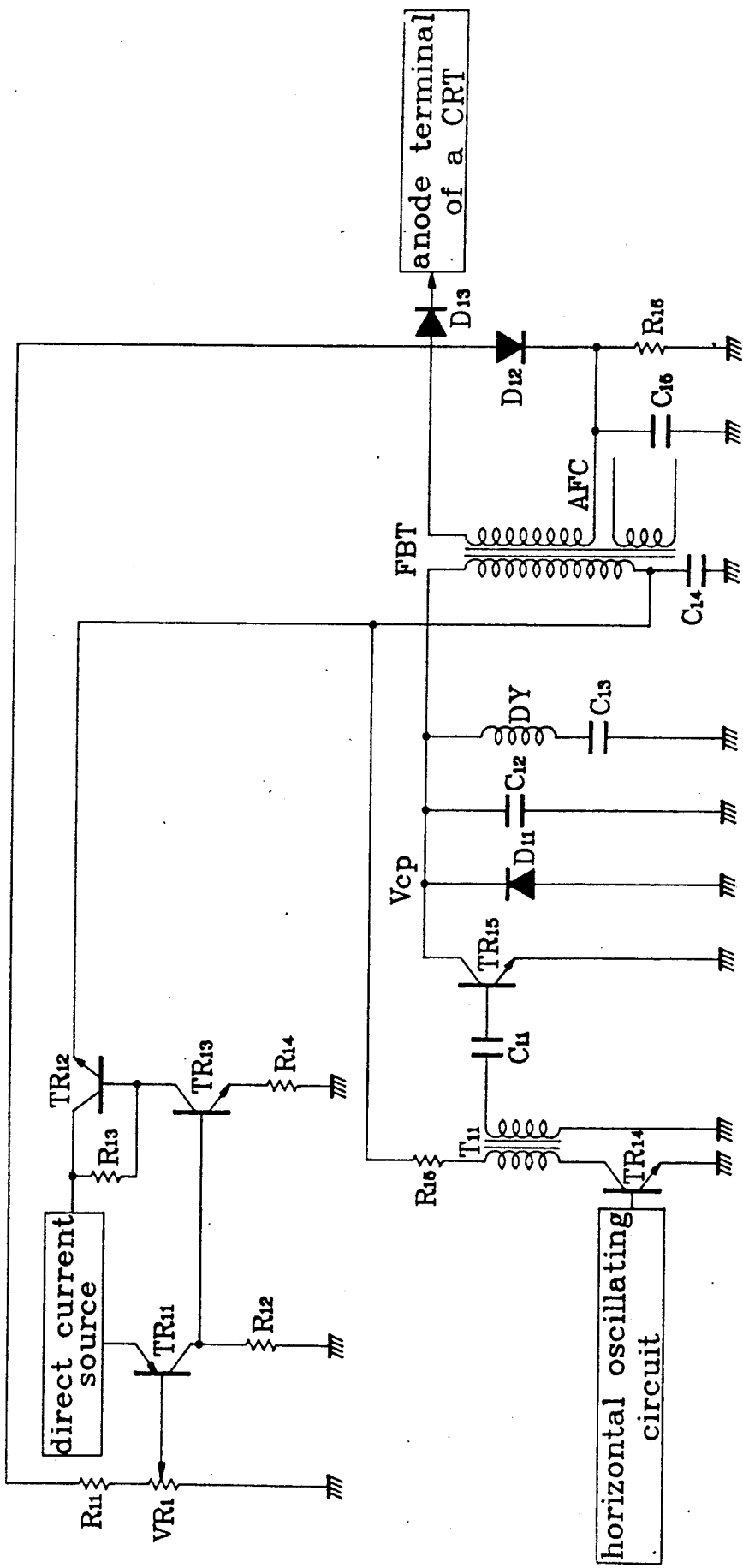
FIG. 1 is the inventive high voltage stabilizing circuit.
Figure 2:
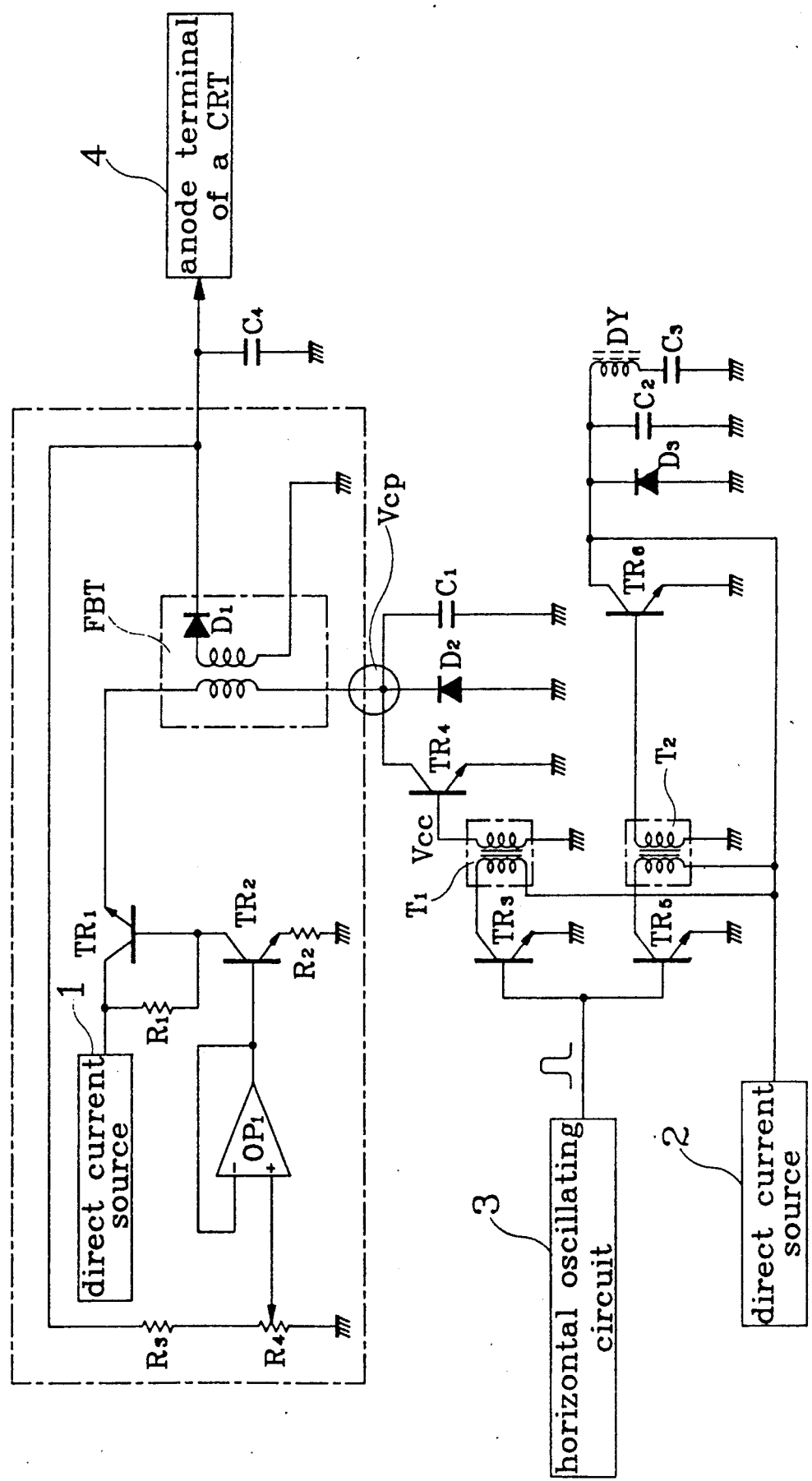
FIG. 2 is the conventional high voltage stabilizing circuit.

Referring FIG. 1, a direct current source is connected to the emitter of first transistor TR11 and the collector of a second transistor TR12, between whose collector and base is connected a resistor R13. The base of the second transistor TR12 is connected to the collector of a third transistor TR13, whose base is connected to the collector of the first transistor TR11 having a resistor R12. The emitter of the third transistor TR13 is grounded through resistor R14.

The base of the first transistor TR11 is connected to the intermediate terminal of a variable resistor VR1, whose one end is grounded and the other end is connected through the resistor R11 to the intermediate terminal AFC of the secondary high voltage stage of the flyback transformer FBT, i.e. the anode terminal of a diode. The intermediate terminal AFC of the secondary coil of the flyback transformer FBT is connected to the cathode of the diode D12 via grounded condensor C15 and resistor R16.

The emitter of the second transistor TR12 is connected to one terminal of the primary coil of the flyback transformer FBT, while connected to the collector of a fourth transistor TR15 through a resistor R15 and the primary coil of a transformer T11. The base and emitter of the fourth transistor TR14 are respectively connected to a horizontal oscillating circuit and the ground.

The secondary coil of the transformer T11 is connected through a condenser C11 to the base of a fifth transistor TR15, whose collector is connected to the emitter of the second transistor TR12 via a damping diode D11, a condenser C12, a horizontal deflection coil DY and the primary coil of the flyback transformer FBT, whose secondary high voltage terminal is connected to a high voltage diode D13 to rectify the high voltage applied to the anode terminal of a CRT.

Preceding to the description of the operation of the inventive circuit, it is noted that the high voltage for working the CRT is generally obtained by multiplying from three to eight times the voltage that the flyback pulse generated from the collector of the horizontal output transistor during the horizontal retrace is raised to high voltage by the high voltage coil of the flyback transformer FBT.

The horizontal flyback pulse Vcp is represented by the following Equation(1).

$$Vcp = Vcc\left\{\frac{\pi}{2}\left(\frac{Th}{Tr} - 1\right) + 1\right\} \quad (1)$$

Wherein
Vcp: horizontal flyback pulse
Vcc: the voltage applied to the horizontal output transistor
Th: horizontal scanning period (=1/horizontal oscillating frequency)
Tr: horizontal retrace time ($=\pi\sqrt{LC}$)
L: the inductance of the primary coil of the flyback transformer
C: tuning condenser In the Equation(1), the horizontal scanning period Th is changed according to the horizontal frequency change, so that the horizontal flyback pulse Vcp is changed to change the high voltage applied to the CRT.

If the horizontal oscillating frequency becomes high(Th shortened), the direct current applied to the horizontal output transistor TR15 is raised to augment the horizontal flyback pulse Vcp, while if the horizontal oscillating frequency becomes low, i.e. the horizontal scanning period Th prolonged, the direct current voltage is lowered to lower the horizontal flyback pulse Vcp, thus always maintaining a constant flyback pulse Vcp. In order to control the voltage applied to the horizontal output transistor TR15, the high voltage variance detected from the high voltage output terminal is delivered to the first transistor TR11, which changes the base voltage of the voltage control second transistor TR12 so as to change the direct current voltage applied to the horizontal output transistor TR15, thereby keeping constant the horizontal flyback pulse Vcp generated from the collector of the horizontal output transistor TR15 to stabilize the high voltage. Hence, the secondary high voltage coil of the flyback transformer FBT delivers the high voltage rectified through the high voltage diode D13 to the anode terminal of the CRT.

Referring FIG. 1, the direct current source is applied to the collector of the second voltage control transistor TR12, and therefore to the collector of the high voltage generating horizontal output transistor TR15 through the flyback transistor FBT. In this case, if the horizontal oscillating circuit applies the horizontal drive pulse to the base of the fourth transistor TR14, the horizontal drive signal invertedly amplified by the fourth transistor TR14 is applied to the base of the fifth transistor TR15 through the horizontal oscillating transformer T11, so that the fifth transistor TR15 alternately turns on and off. Hence, in the fifth transistor TR15 is generated the flyback pulse which is induced in the secondary coil of the flyback transformer FBT. The induced voltage is rectified through the high voltage diode.

Meanwhile, the voltage produced from the secondary coil intermediate terminal AFC of the flyback transformer FBT is detected through the resistor R11 and variable resistor VR1, then applied to the base of the first transistor TR11. The voltage applied to the base of the first transistor TR11 is amplified and delivered to the base of the third transistor TR13, which bias voltage causes the third transistor TR13 to have the collector current. Consequently, if the base voltage of the third transistor TR13 is changed, then the collector current of the second transistor TR12, so that the base voltage of the second transistor TR12 is changed, thereby causing the emitter voltage of the second transistor TR12, i.e. the voltage applied to the fifth transistor TR15, to be changed. Namely, when the voltage Vcc applied to the fifth high voltage generating transistor TR15 from the horizontal oscillating circuit has the lowest frequency of 15.75 KHz, the horizontal drive pulse is applied to the base of the fourth transistor TR14 so as to be amplified. The amplified horizontal drive pulse is delivered through the transformer T11 to the base of the fifth transistor TR15 to switch it.

In this case, the flyback pulse Vcp1 generated in the collector of the fifth transitor TR15 during the fifth transistor TR15 being turned off, i.e. the horizontal retrace has the voltage represented by the following Equation:

$$Vcp1 = Vcc\left\{\frac{\pi}{2}\left(\frac{63.5\,(\mu s)}{Tr} - 1\right) + 1\right\}$$

When the horizontal drive pulse has the frequency of 31.5 KHz, the flyback pulse has the voltage represented by the following Equation:

$$Vcp2 = Vcc\left\{\frac{\pi}{2}\left(\frac{63.5/2\,(\mu s)}{Tr} - 1\right) + 1\right\}$$

Thus, if the horizontal frequency is increased to two times the preceding, the Vcp is reduced to a half times to the preceding. Hence, the high voltage induced in the flyback transformer FBT is reduced to a half times the preceding, thus likewise reducing the voltage induced in the intermediate terminal AFC of the flyback transformer FBT, which voltage is rectified through the diode D12, applied to the base of the first transistor TR11 through the resistor R11 and variable resistor VR1. Here, since the induced voltage is reduced to a half, there is lowered the bias voltage of the base of the first transistor TR11, so that the collector voltage induced through the resistor R12 and thus the bias voltage of the third transistor TR13 are reduced, thereby reducing the collector current of the third transistor TR13.

Consequently, the base voltage of the second transistor TR12 and thus the voltage Vcc of the fifth horizontal output transistor TR15 are increased, so that the flyback pulse always has a constant voltage Vcp.

In the present circuit, the variable resistor VR1 regulates the detecting sensitivity.

Thus, according to the present invention, it is not necessary to replace the monitor according to the horizontal frequency change(15.7 KHz-32 KHz), and two or more modes are executed by a single monitor. Moreover, the high voltage change due to the horizontal frquency change is detected not at the anode terminal but at the intermediate terminal of the flyback transformer, so that it is not necessary to specially prepare the constituent elements.

What is claimed is:

1. A circuit for stabilizing the high voltage generating circuit in a CRT according to the change of the horizontal oscillating frequency, comprising a diode (D12) the cathode of said diode being connected to the intermediate terminal (AFC) of a flyback transformer (FBT), the anode of said diode (D12) being connected to first resistor (R11) and coupled to a variable resistor (VR1), a first transistor (TR11), the base of said first transistor being connected to the intermediate terminal of said variable resistor (VR1), a second transistor (TR12), a third transistor (TR13), the collector of said first transistor being connected to a grounded second resistor (R12) and to the base of said third transistor, the collector of said third transistor being connected to the base of said second transistor, the collector of said second transistor being connected to a direct current source, a fourth transistor (TR14), the emitter of said second transistor being coupled through the primary coil of said flyback transformer to the collector of said fourth transistor, the base of said fourth transistor being connected to a horizontal oscillating circuit.

* * * * *